(12) United States Patent
Minekus

(10) Patent No.: US 10,016,704 B2
(45) Date of Patent: Jul. 10, 2018

(54) FILTRATION SYSTEM, HAVING A DEFORMABLE WALL

(75) Inventor: Mans Minekus, Delft (NL)

(73) Assignee: Triskelion B.V., Zeist (NL)

(*) Notice: Subject to any disclaimer, the term of this patent is extended or adjusted under 35 U.S.C. 154(b) by 115 days.

(21) Appl. No.: 14/123,327

(22) PCT Filed: May 31, 2012

(86) PCT No.: PCT/NL2012/050384
§ 371 (c)(1),
(2), (4) Date: Jan. 28, 2014

(87) PCT Pub. No.: WO2012/165963
PCT Pub. Date: Dec. 6, 2012

(65) Prior Publication Data
US 2014/0374362 A1    Dec. 25, 2014

(30) Foreign Application Priority Data
May 31, 2011  (EP) ..................... 11168284

(51) Int. Cl.
| | |
|---|---|
| *B01D 29/13* | (2006.01) |
| *B01D 29/56* | (2006.01) |
| *B01D 63/06* | (2006.01) |
| *B01D 69/04* | (2006.01) |
| *B01D 65/00* | (2006.01) |

(Continued)

(52) U.S. Cl.
CPC ............. *B01D 29/13* (2013.01); *B01D 29/56* (2013.01); *B01D 63/06* (2013.01); *B01D 65/00* (2013.01); *B01D 69/04* (2013.01); *B01D 2313/143* (2013.01); *B01D 2313/20* (2013.01); *B01D 2313/24* (2013.01); *B01D 2317/02* (2013.01)

(58) Field of Classification Search
None
See application file for complete search history.

(56) References Cited

U.S. PATENT DOCUMENTS

| | | | | |
|---|---|---|---|---|
| 4,758,341 | A * | 7/1988 | Banner | 210/232 |
| 4,793,932 | A * | 12/1988 | Ford et al. | 210/636 |
| 5,132,015 | A * | 7/1992 | Down | 210/637 |

(Continued)

FOREIGN PATENT DOCUMENTS

| | | |
|---|---|---|
| CN | 1750868 A | 3/2006 |
| CN | 101590338 A | 12/2009 |

(Continued)

OTHER PUBLICATIONS

Berg et al., Machine Translation of WO2010121628, Published 2010, 25 total pages.*

(Continued)

*Primary Examiner* — Bobby Ramdhanie
*Assistant Examiner* — Jonathan Peo
(74) *Attorney, Agent, or Firm* — Banner & Witcoff, Ltd.

(57) ABSTRACT

The invention relates to a filtration system for filtering a fluid containing solid particles. The filtration system comprising a deformable wall defining a chamber interior to the wall, and a tubular shaped membrane arranged in the chamber. Further, the system is arranged for periodically deforming the chamber wall inwardly and outwardly, respectively, for filtering a fluid that is present in the chamber, exterior to the membrane.

8 Claims, 2 Drawing Sheets

(51) Int. Cl.
*B01D 65/02* (2006.01)
*B01D 65/08* (2006.01)

(56) References Cited

U.S. PATENT DOCUMENTS

| | | | |
|---|---|---|---|
| 5,234,605 A * | 8/1993 | Reipur et al. | 210/741 |
| 5,525,305 A * | 6/1996 | Minekus | B01F 11/0065 366/149 |
| 5,611,931 A * | 3/1997 | Liu et al. | 210/653 |
| 6,544,424 B1 | 4/2003 | Shevitz | |
| 6,770,202 B1 * | 8/2004 | Kidd et al. | 210/650 |
| 7,033,499 B2 | 4/2006 | Cohee et al. | |
| 2004/0159616 A1 * | 8/2004 | Cohee | A61L 2/0035 210/767 |
| 2005/0077227 A1 * | 4/2005 | Kirker et al. | 210/321.69 |
| 2009/0008343 A1 | 1/2009 | Gilmour | |
| 2009/0131858 A1 * | 5/2009 | Fissell | B01D 61/145 604/57 |
| 2009/0230053 A1 * | 9/2009 | Mullette | 210/500.23 |
| 2010/0193424 A1 | 8/2010 | Scharstuhl et al. | |

FOREIGN PATENT DOCUMENTS

| | | |
|---|---|---|
| EP | 0642382 A1 | 3/1995 |
| EP | 1907108 A1 | 4/2008 |
| FR | 2815269 A1 | 4/2002 |
| GB | 1508513 A | 4/1978 |
| JP | S51-105981 A | 9/1976 |
| JP | S51-048782 A | 11/1977 |
| JP | S62-125804 A | 6/1987 |
| JP | 2000015012 A | 1/2000 |
| JP | 2010535616 A | 11/2010 |
| WO | 94/09895 A1 | 5/1994 |
| WO | 2009019592 A2 | 2/2009 |
| WO | 2010121628 A1 | 10/2010 |
| WO | 2011/016726 A1 | 2/2011 |

OTHER PUBLICATIONS

Minekus et al., "A computer-controlled system to simulate conditions of the large intestine with peristaltic mixing, water absorption and absorption of fermentation products", Appl. Microbiol. Biotechnol., 1999, 53: pp. 108-114, 7 total pages.*

International Search Report—PCT/NL2012/050384—dated Sep. 27, 2012.

English Version of Japanese Notification of Reasons for Refusal, dated Apr. 4, 2016, and citing JP S62-125804 and JP S51-048782 and thereby satisfying the requirement for a concise explanation of relevance of these documents under 37 CFR 1.98(a)(3)(i) and MPEP 609.04(a)(III).

* cited by examiner

FILTRATION SYSTEM, HAVING A DEFORMABLE WALL

CROSS-REFERENCE TO RELATED APPLICATIONS

This application is a U.S. National Stage application under 35 U.S.C. § 371 of International Application PCT/NL2012/050384 (published as WO 2012/165963 A1), filed May 31, 2012, which claims priority to Application EP 11168284.5, filed May 31, 2011. Benefit of the filing date of each of these prior applications is hereby claimed. Each of these prior applications is hereby incorporated by reference in its entirety.

FIELD OF THE INVENTION

The invention relates to a filtration system for filtering a fluid containing solid particles, comprising a deformable wall defining a chamber interior to the wall, and a tubular shaped membrane arranged in the chamber.

BACKGROUND OF THE INVENTION

For the purpose of analyzing processes in the human stomach and intestine, it is desired to provide an efficient filtration system.

Filtration systems according to the preamble are known wherein a fluid to be filtered is flown through tubes that are placed in a chamber. The membrane is arranged at the interior side of the tubes.

However, it appears in practice that solid particles accumulate on the membrane to form a cake, deteriorating the filtering process. In order to increase the filtering efficiency of a membrane, cake formation can be antagonized by applying a mechanical process, e.g. wiping or applying a shear flow along the membrane.

SUMMARY OF THE INVENTION

According to an aspect of the invention, there is provided a system according to the preamble, wherein the system is arranged for periodically deforming the chamber wall inwardly and outwardly, respectively, for filtering a fluid that is present in the chamber, exterior to the membrane, wherein the membrane includes a tubular supporting element and a membrane layer arranged on the outer surface of the tubular supporting element, the membrane layer including channels having a smaller diameter with increasing radial offset with respect to the longitudinal axis of the tubular shaped membrane.

By providing the fluid to be filtered in the chamber, outside the membrane, and by inducing a fluid flow by mechanically changing the chamber volume, an efficient filter process can be performed, wherein the growth of cake is reduced considerably. The squeezing, kneading and/or pushing effect of the moving chamber wall forces a tangential flow along the membrane surface and generate shear forces that counteract the forming of cake.

Advantageously, the system according to the invention enables a filter configuration wherein the membrane is situated on the outside of the filtration tube, so that in principle no mechanical parts are needed to clean the membrane. Further, if a mechanical cleaning action is desired, such a process can then be performed relatively easily, due to the exterior position of the membrane.

The invention also relates to a method of filtering a fluid containing solid particles.

BRIEF DESCRIPTION OF THE DRAWINGS

By way of example only, embodiments of the present invention will now be described with reference to the accompanying figures in which.

The figures are merely schematic views of preferred embodiments according to the invention. In the figures, the same reference numbers refer to equal or corresponding parts.

DETAILED DESCRIPTION OF THE INVENTION

Figure 1:
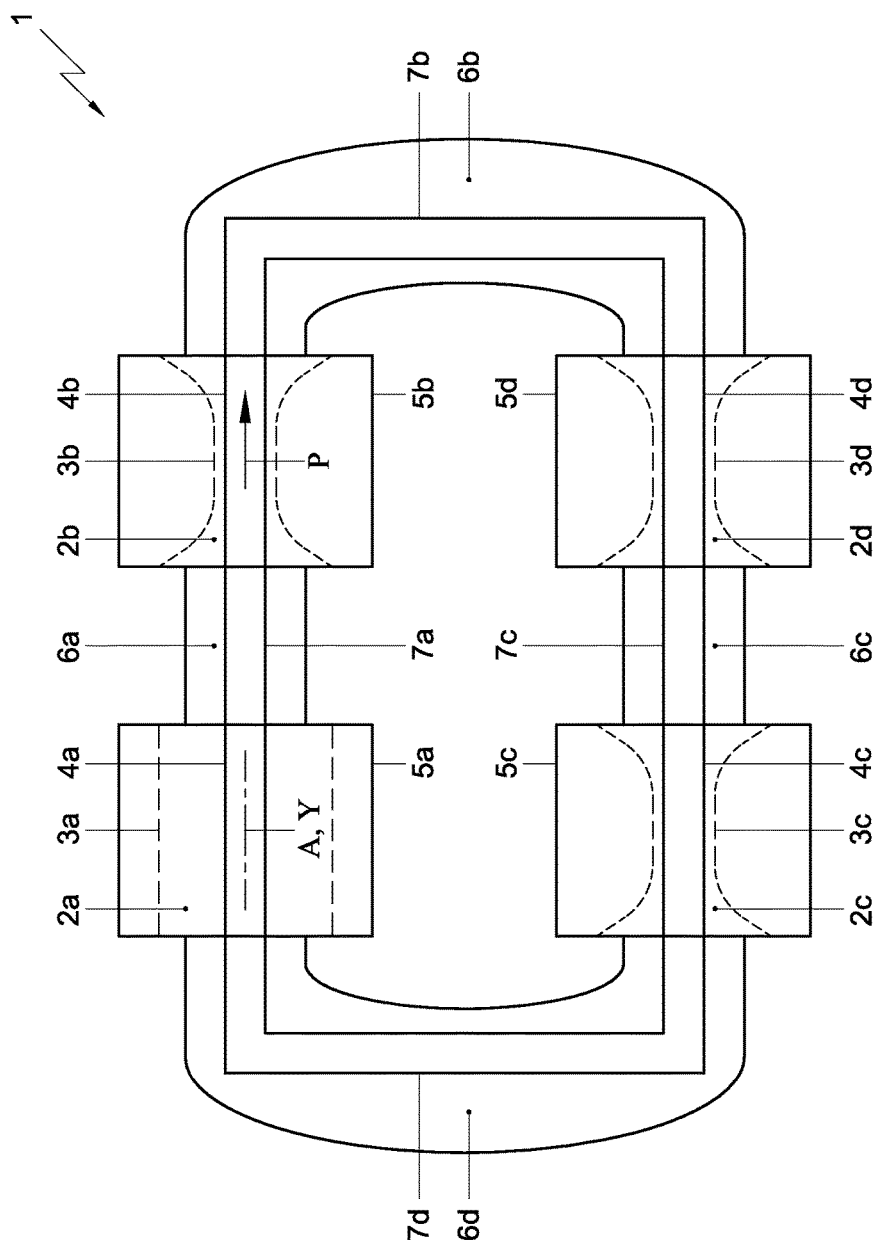
FIG. 1 shows a schematic cross sectional view of a filtration system according to the invention.

FIG. 1 shows a schematic cross sectional view of a filtration system 1 according to the invention. The filtration system 1 is arranged for filtering a fluid containing solid particles, and comprises a multiple number of chambers 2a-d defined interior to deformable walls 3a-d. Further, the system 1 includes respective tubular shaped membranes 4a-d arranged in the corresponding chambers 2a-d.

The system includes housings 5a-d wherein the chambers 2a-d are accommodated. Further, the filtration system 1 including a multiple number of intermediate chamber members 6a-d and corresponding intermediate tubular shaped membranes 7a-d for arranging the chambers 2 and the membranes 4 in series. In the shown embodiment, the chambers 2 and the membranes 4 form each a closed circuit, respectively.

It is noted that membranes 4 and intermediate membranes 7 can be integrated in unitary elements. As an example, a first tubular shaped membrane 4a and an adjacent second tubular shaped membrane 4b can be implemented as a single membrane, including the intermediate tubular shaped membrane 7a between the first and the second membrane 4a-b.

In the shown embodiment, the longitudinal axis A of a tubular shaped membrane 4a is substantially parallel to a symmetry axis of the corresponding chamber 2a. In FIG. 1 the symmetry axis Y of the corresponding chamber coincides with the longitudinal axis A of the membrane 4a.

During operation of the filtration system 1, a fluid to be filtered flows through the chambers 2a-d, substantially in a direction parallel to the symmetry axis Y of the chamber 2. The flow is induced by periodically deforming the chamber wall 3 inwardly and outwardly, in a radial direction with respect to the symmetry axis Y of the chamber 2. By periodically deforming the chamber wall 3 in a peristaltic movement, a fluid flow in a direction parallel to the symmetry axis Y is caused.

In this context, a peristaltic movement is to be understood as a radially symmetrical contraction and relaxation of the chamber wall propagation as a wave along the symmetry axis Y of the chamber, thereby pushing material forwardly in a propagation direction P along the symmetry axis Y of the chamber. Such peristaltic movement simulates a peristalsis in the contraction of smooth muscles surrounding the digestive tract to propel contents through said tract. The peristalsis forces a ball of food, called bolus or chime, along the gastrointestinal tract.

By squeezing, kneading and/or pushing the chamber wall 3, the fluid is mixed and propelled parallel to the membrane exterior surface, as a cross flow or tangential flow. In an advantageous manner, shear forces are generated that counteract the forming of an undesired accumulation of solid particles to be filtered from the fluid, also called cake.

Preferably, the chamber wall 3 includes a flexible sleeve that can easily be deformed, e.g. by applying an underpressure and/or overpressure in the remaining part of the corresponding housing 5. However, the chamber wall may include rigid portions that can be moved radially inwardly and outwardly, e.g. driven by an actuator.

Since a multiple number of chambers 2 with corresponding membranes 4 are used, a highly effective filtration process can be carried out. Moreover, the process can also be performed very efficiently. In the shown embodiment, a multiple number of flexible walls 3b-d are set in a radially inward position, while a single flexible wall 3a is periodically moving between a radially inward position and a radially outward position. Then, the available membrane surface is relatively large compared to the fluid volume in the chambers, so that a high efficiency can be obtained in the filter process. Further, by forming a loop of chambers and corresponding membranes tubes, the filtration process can be performed continuously. In principle, as an alternative, also an open chain of chambers and corresponding membrane tube can be implemented. Further, also a single chamber including a single tubular shaped membrane can be applied for performing a filtration process.

Figure 2:
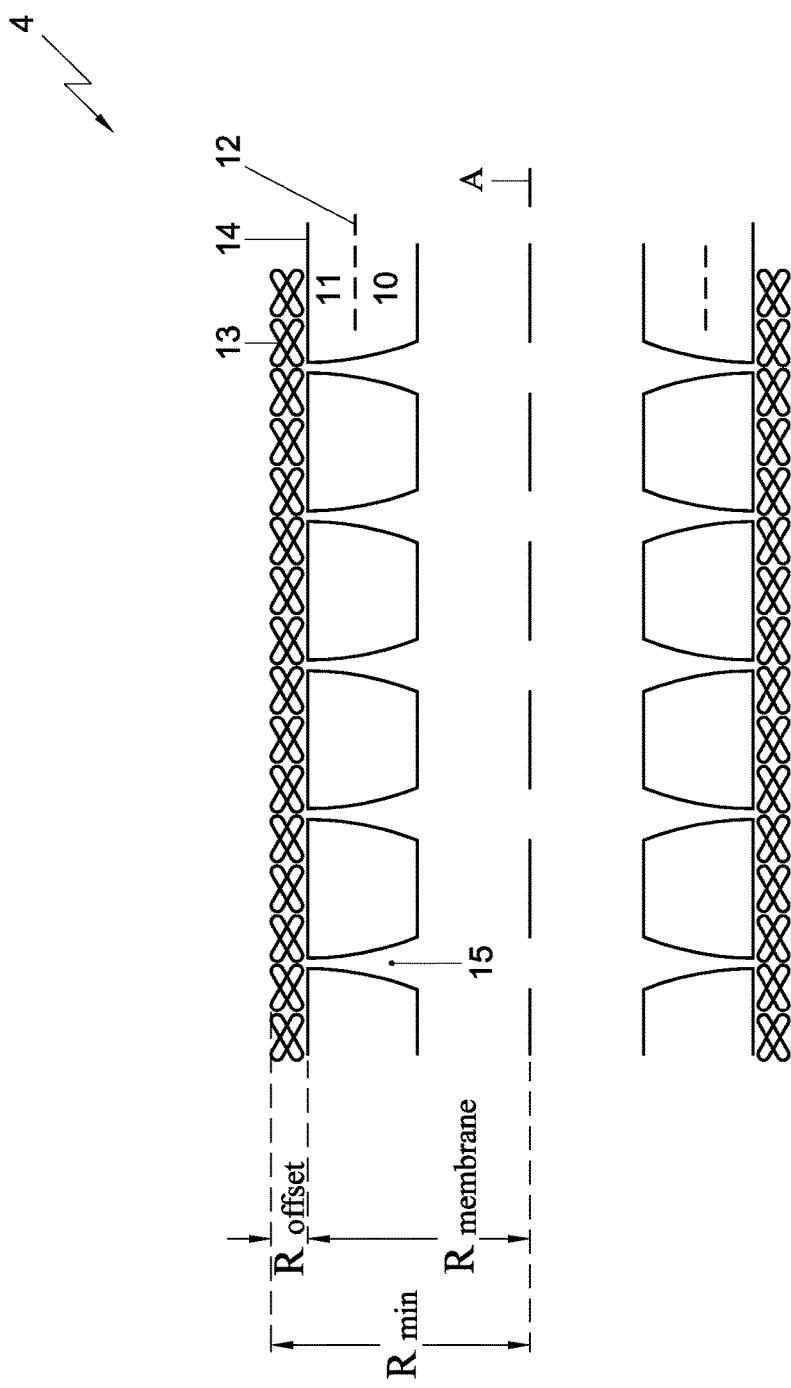
FIG. 2 shows a schematic cross sectional side view of a tubular shaped membrane of a filtration system according to the invention.

FIG. 2 shows a schematic cross sectional side view of a tubular shaped membrane 4 of a filtration system 1 according to the invention. The membrane 4 includes a tubular supporting element 10 and a membrane layer 11 arranged on the outer surface 12 of the tubular supporting element, so that the effective membrane part 11 is located on the exterior side of the tube 4. The channels 15 in the membrane 4 have a smaller diameter with increasing radial offset with respect to the longitudinal axis A of the tube 4. As an effect of the membrane layer position, the forming of a cake is further counteracted.

In the shown embodiment, the tubular supporting element 10 and the membrane layer 11 form an integrated module. As an alternative, the tubular supporting element 10 and the membrane layer 11 are formed separately and mounted to each other. The membrane can be made from a ceramic material, or from another material such as a polymer.

In a very advantageous manner, the filtration system 1 further includes a fluid permeable stiff tubular shaped structure 13 arranged on the exterior surface 14 of the membrane 4 and defining a radial minimum position $R_{min}$ of the deformable wall 3 that is greater than the radial exterior surface position $R_{membrane}$ of the membrane 4.

By applying the fluid permeable stiff tubular shaped structure 13, the volume of the chamber 2 is relatively small, while a fluid flow through the stiff structure can be forced through a ring volume having a radial ring offset $R_{offset}$ and enclosing the tube 4, along the membrane, in a tangential direction, thereby even further increasing the efficiency of the filtering process.

The fluid permeable stiff tubular shaped structure is e.g. implemented as a sock. In principle, each woven or non-woven material that is stiff enough to force the deformable wall to stop moving radially inwardly beyond a radial minimum position greater than the radial exterior surface position of the membrane, but is permeable for the fluid to be filtered, is suitable for application as the fluid permeable stiff tubular shaped structure mentioned above.

Optionally, the filtration system is provided with a heating element for heating the fluid in the chamber, e.g. in case the viscosity of the fluid to be filtered increases above a desired level.

The filtration system according to the invention can be used for filtering a test content of the intestine when analyzing processes in the gastrointestinal tract.

However, also other fluid types can be filtered using the system of the invention, e.g. slurries or fluids to be analyzed in pharmaceutical or other laboratorial models.

Experiments have shown that a tubular shaped membrane having a length of 50 cm, an outer diameter of 10 cm and a pore size of 100 nm is able to perform a filtration of a slurry with a filtration rate of 3 ml/minute was possible during a period of 3 hours.

The invention is not restricted to the embodiments described herein. It will be understood that many variants are possible.

Instead of applying a single tubular shaped membrane in the chamber, a multiple number of tubular shaped membranes can be arranged in the chamber of the filtration system according to the invention.

Other such variants will be apparent for the person skilled in the art and are considered to fall within the scope of the invention as defined in the following claims.

The invention claimed is:

1. A filtration system for filtering a fluid containing solid particles, comprising a multiple number of chambers arranged in series, the chambers being defined interior to respective deformable walls, wherein respective tubular shaped membranes are arranged in the chambers and are connected in series, the system further comprising a multiple number of intermediate chamber members arranged in series between the chambers, the system further comprising corresponding intermediate tubular shaped membranes arranged in series between the tubular shaped membranes, wherein the system is arranged for periodically deforming the deformable walls inwardly and outwardly, respectively, EXTERIOR TO THE RESPECTIVE TUBULAR SHAPED MEMBRANES, for filtering the fluid CONTAINING THE SOLID PARTICLES that is present in the chambers AND PROPELLED IN A CROSS FLOW OR TANGENTIAL FLOW, exterior to the respective tubular shaped membranes, wherein the tubular shaped membranes include respective tubular supporting elements and membrane layers arranged on outer surfaces of the tubular supporting elements, the membrane layers including channels having a smaller diameter with increasing radial offset with respect to respective longitudinal axes of the tubular shaped membranes, the tubular shaped membranes further including respective fluid permeable tubular shaped structures arranged on the exterior surfaces of the tubular shaped membranes and defining radial minimum positions of the deformable walls that are greater than respective radial exterior surface positions of the tubular shaped membranes, wherein the fluid permeable tubular shaped structures have sufficient stiffness to prevent the deformable walls from moving inwardly beyond the respective radial minimum positions, wherein said periodically deforming the deformable walls results in a peristaltic movement by radially symmetrical contraction and relaxation of the deformable walls inwardly and outwardly, in a radial direction with respect to respective symmetry axes of the chambers, propagating as a wave along said respective symmetry axes, wherein the chambers and the intermediate chamber members form a closed loop and wherein the tubular shaped membranes and the intermediate tubular shaped membranes form a closed loop.

2. The filtration system according to claim 1, wherein the longitudinal axes of the tubular shaped membranes are substantially parallel to the respective symmetry axes of the chambers.

3. The filtration system according to claim 1, wherein the tubular supporting elements and respective membrane layers form integrated modules.

4. The filtration system according to claim 1, wherein the tubular shaped membranes are made from a ceramic material.

5. The filtration system according to claim 1, wherein the deformable walls include respective flexible sleeves.

6. The filtration system according to claim 1, further including a respective heating element for heating the fluid.

7. The filtration system according to claim 1, comprising a multiple number of said tubular shaped membranes arranged in each chamber.

8. A method of filtering a fluid containing solid particles, comprising the steps of:

providing a multiple number of chambers arranged in series, the chambers being defined interior to respective deformable walls, wherein respective tubular shaped membranes are arranged in the chambers and are connected in series, the tubular shaped membranes having radial exterior surfaces and respective fluid permeable tubular shaped structures arranged on the radial exterior surfaces and defining radial minimum positions of the deformable walls that are greater than respective radial exterior surface positions of the tubular shaped membranes, wherein the fluid permeable tubular shaped structures have sufficient stiffness to prevent the deformable walls from moving inwardly beyond the respective radial minimum positions, providing a multiple number of intermediate chamber members arranged in series between the chambers, further providing corresponding intermediate tubular shaped membranes arranged in series between the tubular shaped membranes, and periodically deforming the deformable walls inwardly and outwardly, respectively, between radial outward positions and radial inward positions that are close to the respective radial exterior surfaces of the tubular shaped membranes, for filtering the fluid that is present in the chambers, exterior to the respective tubular shaped membranes, wherein the deformable walls are deformed in a peristaltic movement by radially symmetrical contraction and relaxation of the deformable walls inwardly and outwardly, in a radial direction with respect to respective symmetry axes of the chambers, propagating as a wave along said respective symmetry axes, thereby PROPELLING THE FLUID CONTAINING THE SOLID PARTICLES THAT IS PRESENT IN THE CHAMBERS, IN A CROSS FLOW OR TANGENTIAL FLOW, EXTERIOR TO SAID RADIAL EXTERIOR SURFACES OF THE TUBULAR SHAPED MEMBRANES, and wherein the chambers and the intermediate chamber members form a closed loop and wherein the tubular shaped membranes and the intermediate tubular shaped membranes form a closed loop.

* * * * *